(12) United States Patent
Gover et al.

(10) Patent No.: US 8,289,301 B2
(45) Date of Patent: Oct. 16, 2012

(54) APPARATUS AND METHOD FOR CONTROL OF MULTIPLE DISPLAYS

(75) Inventors: James B. Gover, Las Vegas, NV (US); Graham N. Beland, Hyde Park, UT (US)

(73) Assignee: Young Electric Sign Company, Salt Lake City, UT (US)

(*) Notice: Subject to any disclaimer, the term of this patent is extended or adjusted under 35 U.S.C. 154(b) by 1357 days.

(21) Appl. No.: 11/936,609

(22) Filed: Nov. 7, 2007

(65) Prior Publication Data

US 2009/0115751 A1 May 7, 2009

(51) Int. Cl.
*G06F 3/038* (2006.01)
*G09G 5/00* (2006.01)

(52) U.S. Cl. ............................ 345/204; 345/1.1; 345/89
(58) Field of Classification Search ............... 345/1.1, 345/1.3, 204, 207, 87–89
See application file for complete search history.

(56) References Cited

U.S. PATENT DOCUMENTS

| | | |
|---|---|---|
| 4,514,727 A | 4/1985 | Van Antwerp |
| 5,488,385 A | 1/1996 | Singhal et al. |
| 6,297,785 B1 | 10/2001 | Sommer et al. |
| 6,630,913 B2 | 10/2003 | Lee |
| 6,819,303 B1 | 11/2004 | Berger et al. |
| 6,917,348 B2 | 7/2005 | Demsky et al. |
| 7,057,578 B2 | 6/2006 | Yaniv |
| 7,088,335 B2 | 8/2006 | Hunter et al. |
| 7,259,769 B2 | 8/2007 | Diefenbaugh et al. |
| 2003/0146891 A1 | 8/2003 | Poliakine |
| 2003/0178867 A1 | 9/2003 | Buring et al. |
| 2005/0097476 A1 | 5/2005 | Arora et al. |
| 2005/0117062 A1 | 6/2005 | Chien et al. |
| 2005/0162336 A1 | 7/2005 | McClintock et al. |
| 2006/0055828 A1 | 3/2006 | Henry et al. |
| 2006/0132430 A1 | 6/2006 | Ricks et al. |
| 2006/0227085 A1 | 10/2006 | Boldt, Jr. et al. |
| 2006/0274023 A1 | 12/2006 | Sultenfuss et al. |
| 2006/0284895 A1 | 12/2006 | Marcu et al. |

FOREIGN PATENT DOCUMENTS

| | | |
|---|---|---|
| EP | 1480195 A1 | 11/2004 |
| EP | 1 548 571 A1 | 6/2005 |

OTHER PUBLICATIONS

PCT International Search Report for Application No. PCT/US2008/081707, dated Feb. 23, 2009, 3 pages.

*Primary Examiner* — Kimnhung Nguyen
(74) *Attorney, Agent, or Firm* — TraskBritt (57) ABSTRACT

Methods and systems are disclosed for presenting media content on display systems. The display system includes two or more displays. In some display systems, the displays may be oriented in at least two different directions. Each of the displays are connected to a graphics communication bus. The graphics communication bus communicates common content information for the displays and discrete radiance-control information, which may contain different intensity and color control information for each of the displays. Each of the displays present the content information and adjust radiance characteristics of its display in response to the discrete radiance-control information associated with that display. The display system may include a computing system for controlling the graphics communication bus. The display system may also include ambient light sensors on each facet of the multifaceted display. Information from the ambient light sensors may be used for determining the discrete radiance-control information.

28 Claims, 5 Drawing Sheets

APPARATUS AND METHOD FOR CONTROL OF MULTIPLE DISPLAYS

BACKGROUND

1. Field of the Invention

The present invention relates generally to displaying images, and more specifically, to displaying images on electronic display boards and electronic billboards.

2. State of the Art

Billboards and large signs have been used for many years to convey information to a passerby such as advertising, traffic messages, and the like. Traditionally these signs and billboards were only capable of delivering a single message or advertisement. This message was generally printed on strips of paper that were then adhered to the billboard. To change the message, new paper needed to be printed and adhered to the billboard.

More recently, display boards and billboards have become electronic, using lights, light emitting diodes (LEDs), and other electronic devices to display visual content that can be easily adaptable to display a wide variety of messages in the form of words and images from the same sign without having to physically change the characteristics of the sign. These electronic boards can easily modify a graphic image or message to create video displays and modify the type of message or advertisement that is shown on the electronic board at regular intervals, or at targeted times depending on expected traffic near the sign, or public interest. These possible images are generally referred to herein as visual content.

For conventional billboards, the visual content is delivered to the physical location and affixed to the billboard. With electronic displays, the visual content must still be delivered to the physical location, but the content delivery may be performed electronically. In addition, while traditional billboards may display the same message for weeks or months at a time, electronic displays enable the message to be changed easily and often. Thus, it may be possible to modify the visual content many times in a single day. Furthermore, electronic displays may be networked together such that the displays may communicate with each other, or with a central computer.

Some electronic displays may be configured with multiple sides, such that one side can display content in one direction and another side can display content in another direction. With these electronic displays with multiple sides, there is a need to control the presentation of media content differently for each side.

SUMMARY

The present invention, in a number of embodiments, provides systems and methods for presenting media content on multifaceted displays using a common graphics communication bus to present common content but with different radiance characteristics.

One embodiment is a display system including a graphics communication bus that is configured to communicate common content information for a plurality of displays and discrete radiance-control information, which may contain different intensity and color control information for each of the displays. The display system also includes a display apparatus including the plurality of displays, wherein each of the displays are operably coupled to the graphics communication bus. Each of the displays are configured to present the content information and adjust radiance characteristics of its display in response to the discrete radiance-control information associated with that display.

Another embodiment is a display system that includes a computing system and a multifaceted display apparatus. The computing system includes least one processor operably coupled to a graphics communication bus. The multifaceted display apparatus includes a plurality of displays operably coupled to the graphics communication bus wherein at least one display of the displays is oriented in a direction different from another of the displays. The display system is configured to adjust one or more radiance characteristics of one display differently from the one or more radiance characteristics of another display responsive to adjustment information on the graphics communication bus.

Another embodiment is a method that includes sensing an ambient light incident on a facet of a multifaceted display apparatus and correlating at least one graphical output characteristic of a display disposed on the facet to the ambient light incident on the facet. This correlation may be in a manner different from correlation of the graphical output characteristic of another display disposed on another facet of the multifaceted display apparatus.

Another embodiment is a method that includes controlling a plurality of displays from a graphics communication bus. The method further includes receiving output control information on the graphics communication bus wherein the output control information includes an output control field for each display of the plurality. The method also includes adjusting at least one radiance characteristic of at least one of the displays in response to the output control information for that display.

Another embodiment is a method that includes communicating graphical information to a plurality of displays. The graphical information includes a discrete radiance-control portion for each display and a common content portion. The method also includes modifying the common content portion for at least one of the displays in response to the discrete radiance-control portion corresponding to that display. For each display, the common content portion for that display is displayed.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION

In the following description, elements, circuits, and functions may be shown in block diagram form in order not to obscure the present invention in unnecessary detail. Conversely, specific implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Furthermore, in this description of embodiments of the invention, reference is made to the accompanying drawings that form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Figure 1:
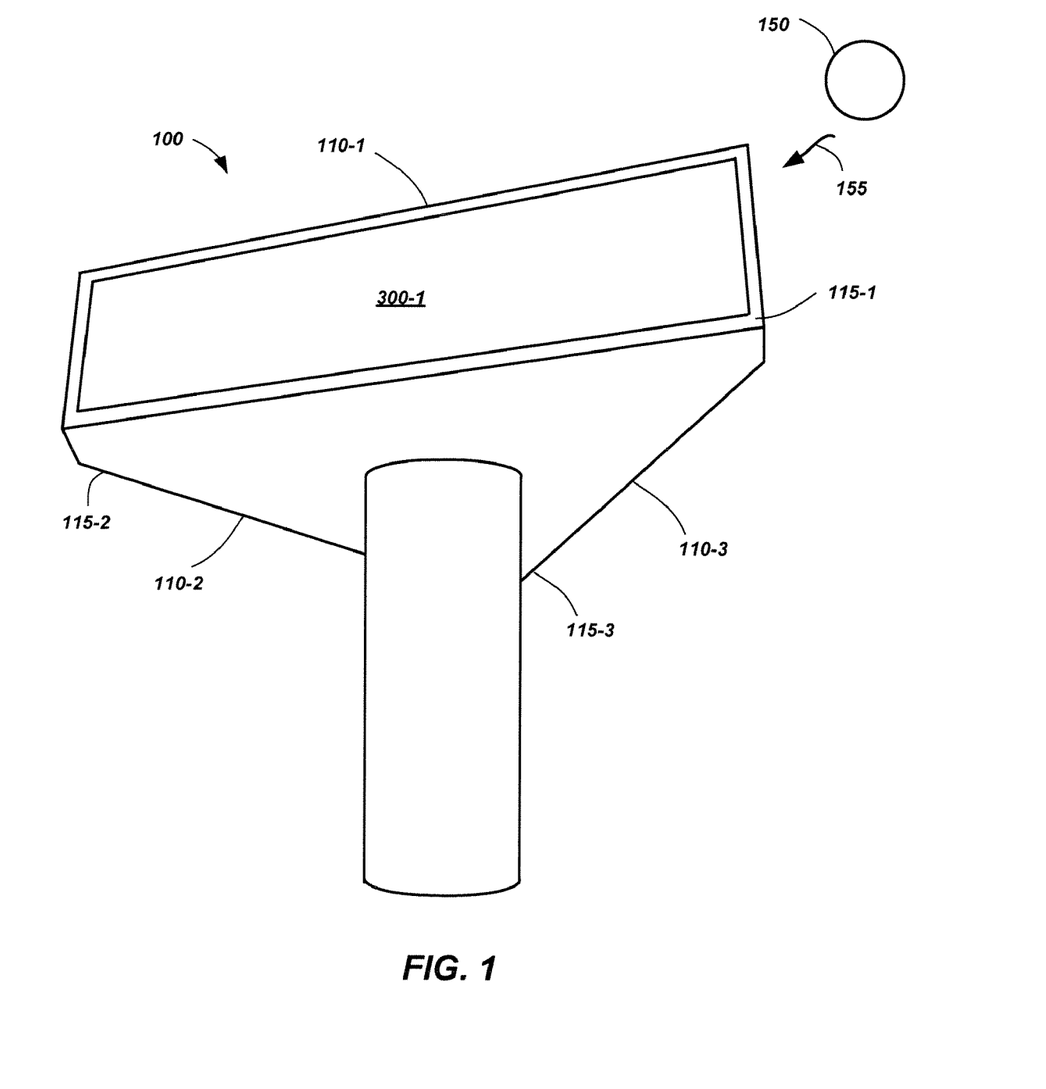
FIG. 1 is perspective representation of a multifaceted display apparatus.

FIG. 1 is perspective representation of a multifaceted display apparatus 100 with three different facets 110. A first facet 110-1 faces a first direction, a second facet 110-2 faces a second direction, and a third facet 110-3 faces a third direction. Each facet 110 may include an electronic display 300. A first electronic display 300-1 is illustrated on the first facet 110-1. Electronic displays 300 on the other facets (110-2 and 110 3) are hidden if FIG. 1 and thus not shown. Of course, one or more of the facets 110 may be a fixed display, such as a painted display or paper display such as are common in many billboards. There may be any number of facets 110 in the multifaceted display apparatus 100 as long as at least two of the facets 110 include an electronic display 300. In addition, all of the facets 110 may include electronic displays 300. Furthermore, FIG. 1 is a non-limiting example wherein all the facets 110 are illustrated as substantially perpendicular to the ground. However, facets 110 may be positioned in other orientations, such as, for example, pointing down, pointing partially downward, pointing up, pointing partially upward, or other suitable orientation.

As yet another non-limiting example of a physical configuration, the two or more facets may be facing the same direction but positioned differently. In other words, one facet may be positioned above another facet, one facet may be positioned horizontally from another facet, or one facet may be positioned diagonally from another facet.

Electronic displays 300 may take on a number of forms and formats. By way of example, and not limitation, electronic displays 300 may be in the form of billboards, displays on busses, displays on bus shelters, mall directory signs, airport signs, signs in sporting and other event arenas, signs on taxis, and any other place where displays are used by multiple advertisers.

The visual content to be presented on the displays 300 may be formatted in any suitable format for presenting and transmitting video, still-images, and text. By way of example, and not limitation, some of the formats may include ASCII text, graphic interchange formats (GIF), bitmap (BMP) formats, Joint Photographic Experts Group (JPEG) formats, Moving Picture Experts Group (MPEG) formats, and the like. Also as non-limiting examples, the visual content may include animations, Really Simple Syndication (RSS) feeds, web pages, time of day, temperature, stock quotes, emergency information, eXtensible Markup Language (XML) files, data files, Hyper-Text Markup Language (HTML) files, and combinations thereof.

Similarly, the multifaceted display apparatus 100 may include audio content through an audio output (not shown). The audio content may be formatted in any suitable format for presenting and transporting audio. By way of example, and not limitation, some of the formats may include MPEG-3 (MP3), wave (WAV), windows media audio (WMA), Advanced Audio Coding (AAC), and the like.

Light sensors 115 may be included on one or more facets 110 of the multifaceted display apparatus 100. Illustrated in FIG. 1 are a first light sensor 115-1 on the first facet 110-1, a second light sensor 115-2 on the second facet 110-2, and a third light sensor 115-3 on the third facet 110-3. As a non-limiting example, the light sensor 115 on each facet 110 is illustrated in the lower right corner of the facet 110. Of course, the light sensor 115 may be positioned in many other suitable locations to detect incident light 155 impinging on the facet 110. Furthermore, while not illustrated, each facet 110 may include more than one light sensor 115 at more than one location on the facet 110.

A light source 150, generating incident light 155, is also illustrated in FIG. 1. The light source 150 may be any source that generates light that may impinge on one or more of the facets 110 of the multifaceted display apparatus 100. As non-limiting examples, the light source 150 may be the sun, the moon, light sources 150 directed to one or more facets 110, or other light sources 150 located in proximity to the multifaceted display apparatus 100.

Many times, an advertiser or other display user may wish to present the same visual content on electronic displays 300 on more than one facet 110. As a result of displaying the same visual content on each facet 110, the multifaceted display apparatus 100 may be configured such that each display 300 receives the same information for the visual media content on the same signal bus. As a result, conventionally, these displays 300 have presented the same visual content with the same color and light intensity. However, if a light source 150 is impinging more directly on one facet 110 than on other facets 110, it may be difficult to read the facet 110 facing the light source 150.

As a non-limiting example, for a two-sided display apparatus 100 with facets 110 facing east and west, near sunrise or sunset the sun may shine directly on one facet 110 while the other facet 110 is shaded. As a result, when both signs have the same intensity and color it may be difficult to read the sign facing the sun while the sign facing away from the sun may appear too bright. Similarly, even with multiple facets facing the same direction, one facet may be more shaded from a light source than another facet.

The present invention, in a number of embodiments, provides systems and methods for presenting media content on multiple displays using a common graphics communication bus to present common content but with different radiance characteristics on each facet 110 of the multiple displays.

As used herein, radiance generally refers to the amount and color of light that is emitted by an electronic display 300. Many different radiance characteristics may be modified to adjust the media content output to appear more accurately and for easier viewing. As non-limiting examples, some radiance characteristics are output intensity, output color, gamma adjustment, color temperature adjustment, and combinations thereof. In general, "radiance" refers to the total light emissions from the display, whereas "spectral radiance" refers to the radiance in a narrow band of the color spectrum. In other words, red spectral radiance refers to the light emission of the narrow frequency band of the color red.

As used herein, intensity refers to the overall amount of light emitted by the display across the entire visible light spectrum. Thus, increasing the intensity of a display pixel comprising red, green, and blue elements may include increasing the light output for all of the red, green, and blue elements comprising that pixel. As a result of the differences that may occur due to various light sources 150 impinging on one display 300 in a manner different from another display 300, each display 300 of the multifaceted display apparatus 100 may modify the intensity of the display 300 differently to compensate for various light sources 150.

As used herein, gamma, or gamma correction, refers to the modification of the signal input to a pixel to correct for non-linearity in the pixels' output characteristics, to correct for ambient light conditions, and combinations thereof. Gamma correction may be performed for each color of an image independently. Thus, for a display 300 with pixels made of red, green, and blue elements, gamma correction may be performed differently for each of the red, green, and blue components of the visual media. Thus, gamma correction can modify the overall intensity (i.e., luminance) of an image as well as the color composition (i.e., chrominance) of the image.

Figure 2:
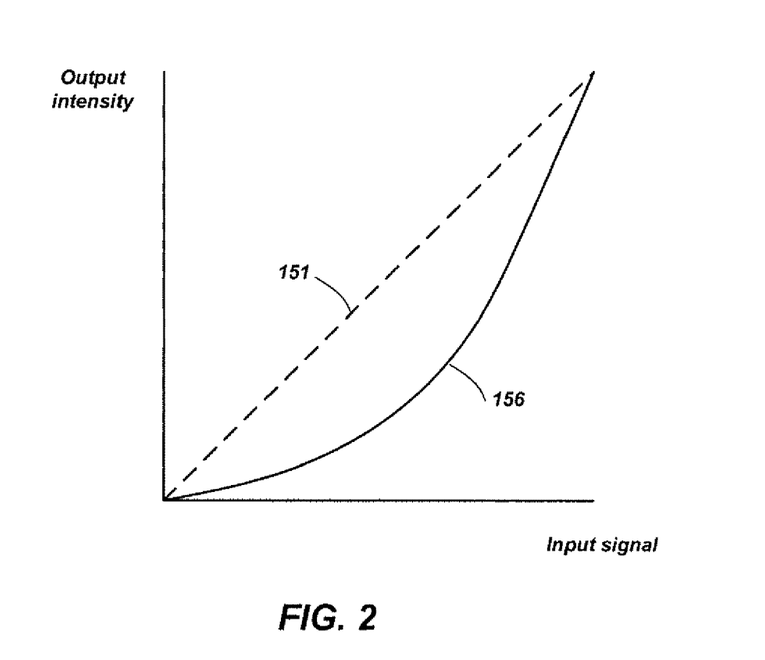
FIG. 2 is a simplified graph of input signal versus output intensity for a display.

Most display devices have non-linear characteristics for the intensity output by the display relative to the input signal. FIG. 2 is a simplified graph of an input signal 151 versus actual output intensity 156 for a display. In the graph, the input signal and output intensity are normalized from zero to one and the input signal is illustrated as a straight line from zero to one where the intended output intensity would also transition from zero to one in a linear relationship to the input signal. However, because of the non-linear response of the display, an intensity to voltage response curve is illustrated that for many displays is roughly a 2.5 power function. In other words, a signal sent to the display will have an actual displayed intensity that follows the equation $L=V^{2.5}$.

Figure 3:
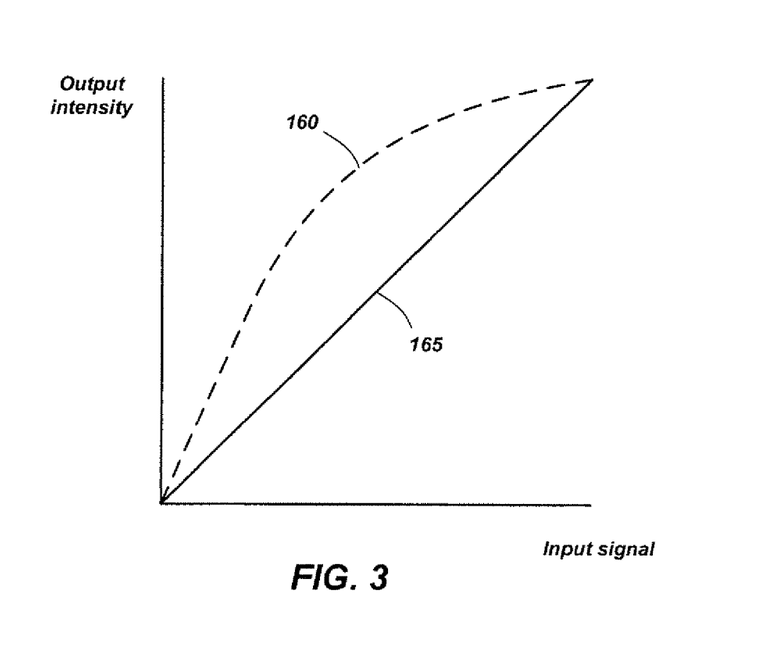
FIG. 3 is a simplified graph of input signal versus output intensity for a display after gamma correction.

Gamma correction compensates for this non-linearity by sending a corrected signal to the display. FIG. 3 is a simplified graph of input signal 160 versus output intensity 165 for a display after gamma correction. The signal is adjusted so that it is substantially the complement of the curve of FIG. 2. Gamma correction can also include other considerations, such as, for example, ambient light. Therefore, as a result of the differences that may occur due to various light sources 150 impinging on one display 300 in a manner different from another display 300, each display 300 of the multifaceted display apparatus 100 may use a different gamma correction to compensate for various light sources 150. Gamma correction may be performed in a number of ways in a number of locations within a system as is explained more fully below.

As used herein, color temperature refers to a characteristic of visible light. The color temperature of a light source 150 is determined by comparing its chromaticity with a theoretical, heated black-body radiator. Color temperature of the display 300 or light sources 150 impinging on the display 300 may cause distortions in the actual perceived color. As examples, due to different color temperatures, images viewed under incandescent lights may appear to have a yellowish tint, whereas images viewed under fluorescent lights may appear to have a bluish tint. Similarly, as the sun crosses the sky, it may appear to be red, orange, yellow or white depending on its position. This change in color may distort the perceived colors of an image on one or more of the displays 300. While the changing color of the sun over the course of the day may not be directly a color temperature phenomena, the change in color may be corrected in the same way as corrections for other color temperature discrepancies. In addition, the color temperature discrepancy may be different for a display 300 directly facing the sun than for a display 300 in shadow. Thus, each display 300 of the multifaceted display apparatus 100 may use a different color temperature modification.

Figure 4:
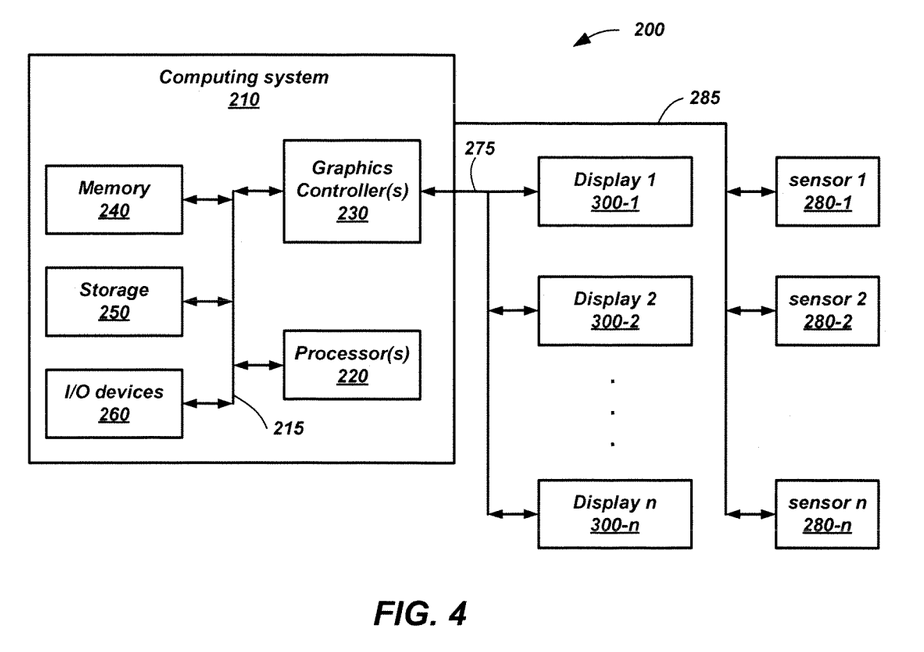
FIG. 4 is a simplified block diagram of a display system including a computing system and multiple displays coupled to the computing system.
Figure 5:
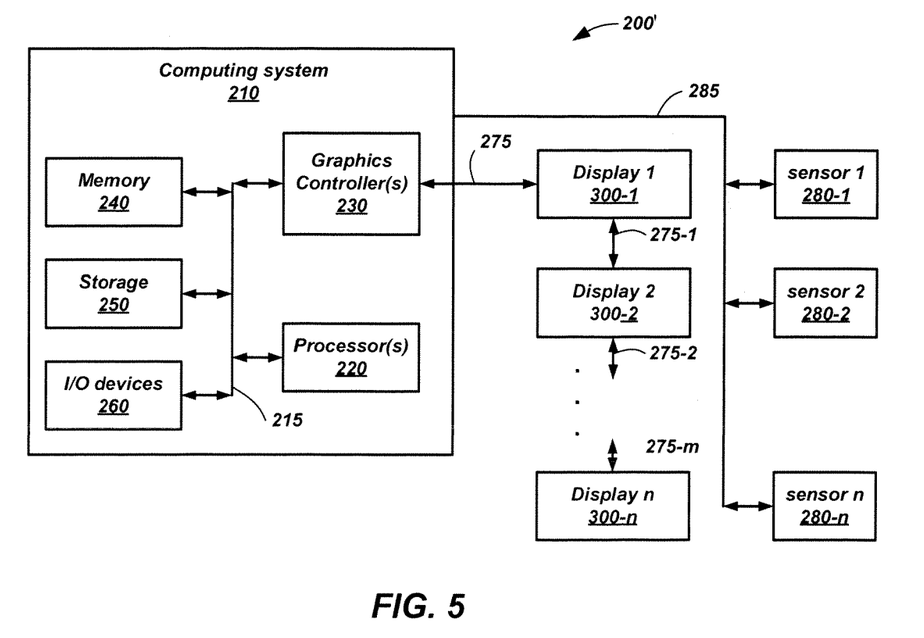
FIG. 5 is a simplified block diagram of another display system including a computing system and multiple displays coupled to the computing system.

FIGS. 4 and 5 are simplified block diagrams of display systems (200 and 200') including a computing system 210 and multiple displays (300-1 through 300-n) coupled to the computing system 210. The computing system 210 is configured for executing software programs containing computing instructions and includes one or more processors 220, memory 240, storage 250, and one or more Input/Output (I/O) elements 260. The computing system 210 may also include one or more graphics controllers 230. The various elements of the computing system 210 may be connected by one or more internal busses 215.

The one or more processors 220 may be configured for executing a wide variety of operating systems and applications including computing instructions for carrying out embodiments of the present invention.

The memory 240 may be used to hold computing instructions, data, and other information for performing a wide variety of tasks including performing embodiments of the present invention. By way of example, and not limitation, the memory 240 may include Synchronous Random Access Memory (SRAM), Dynamic RAM (DRAM), Read-Only Memory (ROM), Flash memory, and the like.

The storage 250 may be used for storing large amounts of non-volatile information for use in the display system 200 and may be configured as one or more storage devices. By way of example, and not limitation, these storage devices may include computer-readable media (CRM). This CRM may include, but is not limited to magnetic and optical storage devices such as disk/disc drives, magnetic tapes, CDs (compact discs), DVDs (digital versatile discs or digital video discs), and other equivalent storage devices.

The I/O elements 260 may be any suitable input output devices such as displays, keyboards, mice, and communication elements. The I/O elements 260 may be configured for communicating with other devices or communication networks. By way of example, and not limitation, the I/O elements 260 may include elements for communicating on wired and wireless communication media, such as for example, serial ports, parallel ports, Ethernet connections, universal serial bus (USB) connections IEE 1394 ("firewire") connections, bluetooth wireless connections, 802.1a/b/g/n type wireless connections, and other suitable communication interfaces and protocols.

Communication bus 285, operably coupled to the computing system 210 and sensors 280, may be once such communication bus 285. Sensors (280-1 through 280-n) may be light sensors 115 as was described above with reference to FIG. 1. Thus, there may be one or more sensors 280 associated with each display 300. The communication bus 285 may be used for sending control information from the computing system 210 to the sensors 280 and communicating light information from the sensors 280 to the computing system 210. The light information may be in the form of an analog signal correlated to the amount of light detected or a digital signal correlated to the amount of light detected. Communication of the light information may be substantially continuous, at regular periodic intervals, or on demand. In the case of periodic intervals or on demand, communication of the light information may be initiated by the computing system 210 or by the sensors 280.

With multiple sensors 280 associated with each display 300, the light information from each sensor may be combined with other light information from other sensors associated with that display 300. This combination may be in the form of mathematical averaging or weighting based on the relative positions of the sensors 280. In addition, failure or improper operation of one sensor 280 may be compensated by other sensors 280 associated with that display 300.

Graphical information is communicated between the computing system 210 and the displays 300 on a graphics communication bus 275 (also may be referred to herein as a display bus 275). The graphics communication bus 275 may be operably coupled with the graphics controller 230. In some embodiments, there may not be a graphics controller 230 and the graphics control function may be performed by the processor 220. In still other embodiments, the graphics controller 230 may be embedded in the processor 220.

In the embodiment of FIG. 4, the graphics communication bus 275 is configured as a parallel bus wherein all the displays 300 are coupled in parallel and receive the same information from the computing system 210.

In the embodiment of FIG. 5, the graphics communication bus 275 is configured as a daisy-chain bus wherein all displays 300 still receive the same information from the computing system 210 but are coupled in a serial fashion. Thus, display 300-1 is coupled to the graphics communication bus 275 and a first daisy-chain graphics communication bus 275-1. Similarly, display 300-2 is coupled to the first daisy-chain graphics communication bus 275-1 and a second daisy-chain graphics communication bus 275-2, This daisy-chain connection may be repeated up to a last daisy-chain graphics communication bus 275-m coupled to a last display 300-n.

Of course, while not shown, those of ordinary skill in the art will recognize that hybrid embodiments may also be used, wherein some of the displays 300 may be coupled in parallel and some of the displays 300 may be daisy-chained.

As non-limiting examples, the graphics communication bus 275 may be a Video Graphics Array (VGA) bus, a Digital Video Interface (DVI) bus, a High Definition Media Interface (HDMI) bus, a Serial Digital Interface (SDI) bus, or other communication bus suitable for transmitting graphical frame information.

In operation, the computing system 210 sends content along the graphics communication bus 275 to the displays 300. The content may be common to more than one of the displays 300. In other words, two or more of the displays 300 will present the same visual image. However, the computing system 210 may also receive light information from the various sensors 280. Using this light information, the computing system 210 may transmit adjustment information along with the common content to the displays 300. The adjustment information may be different for each display 300 as is explained more fully below. As a result, each display 300 may present the same common content but with different radiance characteristics based on the adjustment information, which may be correlated to light information for that display 300.

Alternatively, adjustment information may be correlated to information other than the light information obtained from the light sensors 115. As non-limiting examples, the adjustment information may be correlated to time of day information, sun position information, moon position information, external light source information, and combinations thereof.

In addition, the common content may be segmented such that a portion of the common content is intended for one or more displays and a portion of the content is intended for one or more other displays. The portion of the common content to present on any given display may be determined based on a content portion indicator communicated on the graphics communication bus 275 along with the common content.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in the flow charts Furthermore, the processes may be implemented in any suitable hardware, software, firmware, or combinations thereof.

When executed as firmware or software, the instructions for performing the processes may be stored on a computer-readable medium. A computer-readable medium includes, but is not limited to, magnetic and optical storage devices such as disk/disc drives, magnetic tape, CDs (compact discs), DVDs (digital versatile discs or digital video discs), and semiconductor devices such as RAM, DRAM, ROM, EPROM, and Flash memory.

By way of non-limiting example, computing instructions for performing the processes may be stored on the storage 250, transferred to the memory 240 for execution, and executed by the processor 220, the graphics controller 230, the display 300, or combinations thereof. The processor 220, graphics controller 230, and display 300, when executing computing instructions configured for performing the processes, constitutes structure for performing the processes. In addition, some or all portions of the processes may be performed by hardware specifically configured for carrying out the processes.

Figure 6:
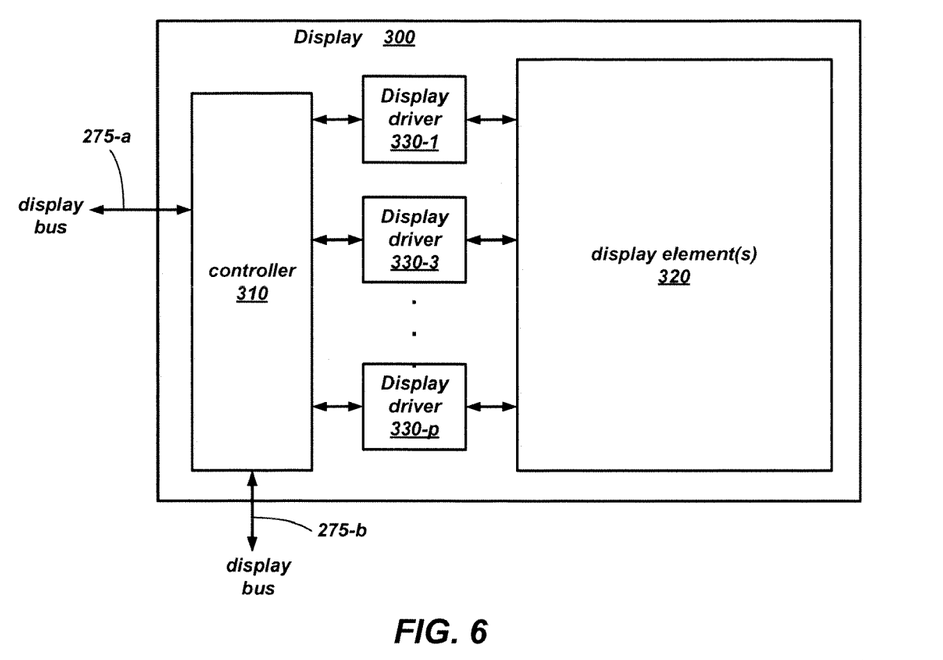
FIG. 6 is a simplified block diagram of a display.

FIG. 6 is a simplified block diagram of a display 300. Each display 300 may include a controller 310, one or more display drivers (330-1 through 330-p), and one or more display elements 320. The display controller may be configured for receiving media content, determining which media content is for the display elements present on that display 300, and determining if output characteristics of the media content to be displayed on this display 300 should be adjusted.

The controller 310 may also include functions such as, for example, formatting the content for its electronic display 300, animating the content for its electronic display 300, controlling presentation of audio content on audio elements, controlling timing of various content on the display element 300, controlling timing of various content on the audio element, and communicating with the computing system 210.

The display elements 320 may be configured with lights, LEDs, liquid crystal displays (LCDs), plasma displays, and the like. Furthermore, the display elements may be partitioned into sections, such that each section may be controlled by a separate display driver 330. As a non-limiting example, in FIG. 6, display driver 330-1 may control an upper strip of the display elements 320, display driver 330-2 may control a middle strip of the display elements 320, and display driver 330-*p* may control a lower strip of the display elements 320. Of course, the segmentation may be in many different forms such as, for example, rectangular sections, horizontal strips, or vertical strips.

The display controller 310 may couple to an input display bus 275-*a* and an output display bus 275-*b*. Thus, displays 300 with only an input display bus 275-*a* could be used in the parallel configuration of FIG. 4, whereas displays 300 that include an output display bus 275-*b* may be configured in the parallel configuration of FIG. 4 or the daisy-chain configuration of FIG. 5.

Figure 7:
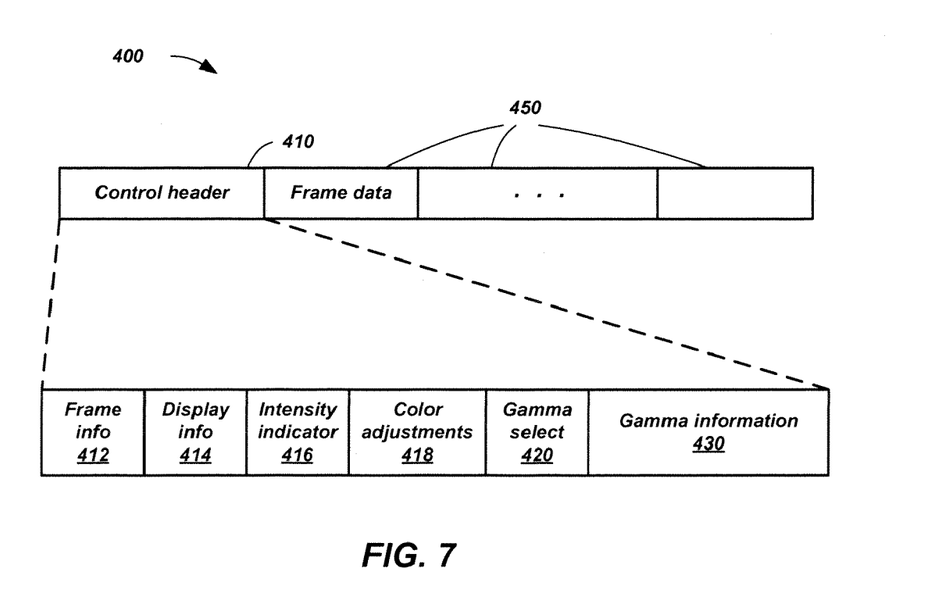
FIG. 7 is a simplified block diagram of a graphics data structure for conveying graphics information on a graphics communication bus.

FIG. 7 is a simplified block diagram of a graphics data structure 400 for conveying graphics information on the graphics communication bus 275. The graphics data structure 400 may include a control header 410 and frame data 450. The frame data 450 may also be referred to herein as common content information or common content portions of the graphics data structure 400. The frame data 450 includes information for each pixel of each line for an entire frame of data. Thus, in the case of video data, the graphics data structure 400 would be repeated for each display frame. As non-limiting examples, some conventional frame data rates are 24 frames per second (fps), 30 fps, 60 fps, and 70 fps. This common content information 450 is used by each display 300 in the display system 200 to present the visual media on the display 300.

The control header 410 may include various information for the controller 310 within the display 300 (FIG. 6) to use in controlling various aspects of presenting the frame data 450 on the display 300. As a non-limiting example, the first few lines of frame data 450 may be non-displayed lines that include this control header 410.

As non-limiting examples of some information that may be included in the control header 410, FIG. 7 illustrates frame information 412, display information 414, intensity indicator 416, color adjustments 418, gamma selections 420, and gamma information 430.

Some of the information in the control header 410 may be common control information that each display 300 in the display system 200 uses to determine information about the frame data 450 or other information used by the display 300. As a non-limiting example, frame information 412 such as frame size in number of pixels per row and number of rows per frame may be common control information. Other non-limiting examples of control information may be clocking and synchronization information.

Some of the information in the control header 410 may be discrete radiance-control information. This discrete radiance-control information may be different and independent for each display 300. Each display 300 may have specific fields in the control header 410 that are addressed to that specific display 300. In other words, many of the fields in the control header 410 may be further broken down such that they include fields for each display within the system.

Alternatively, alternate frames of the control header 410 may include information for alternate displays 300. In other words, a first frame may include an indicator in the frame that any discrete radiance-control information in this frame is for a first display 300-1. A second frame may include an indicator in the frame that any discrete radiance-control information in this frame is for a second display 300-2, and so on up to the total number of displays 300 in the display system 200. The sequence would then repeat for subsequent frames.

As non-limiting examples, FIG. 7 illustrates the intensity indicator 416, color adjustments 418, gamma selections 420, and gamma information 430 as discrete radiance-control information.

As non-limiting examples, the intensity indicator 416 may be a scaling value by which to scale the overall output. For example, if the display includes red, green, and blue colors, the intensity indicator 416 may be an indication to scale the red, green, and blue values by a specified amount relative to the amount present in the frame data 450. Alternatively, the intensity indicator 416 may include scaling factors for each color independently. As still another alternative, the intensity indicator 416 may be specified as an offset to add or subtract from the frame data 450.

As non-limiting examples, the gamma information 430 may include gamma tables or gamma function values. As explained above with reference to FIGS. 2 and 3, gamma correction may be a non-linear function. This gamma correction may be represented as a look-up table for the overall display or look-up tables for each individual color. Alternatively, the gamma correction may be represented by a mathematical function, such as an exponential function or piecewise linear function, Thus, the gamma information 430 may be in the form of tables, or coefficients for functions. The gamma information 430 within any given frame may not represent all the gamma information 430 available. For example, in one frame, the gamma information 430 may be just for a blue gamma table or a portion of a blue gamma table. Then, another frame would include additional gamma information 430. The controller 310 may store the gamma information 430 to develop a complete set of gamma tables, gamma coefficients, or combinations thereof.

As non-limiting examples, the gamma selections 420 may be an indicator of what type of gamma correction should be performed. This indicator may be color specific or may be an overall indicator for the display. For example, the gamma selections 420 may indicate perform no gamma correction, use a specific gamma table of possible gamma tables stored in the controller 310, use specific gamma coefficient of possible gamma coefficients stored in the controller 310, and combinations thereof.

As non-limiting examples, the color adjustments 418 may be a scaling value by which to scale the overall output to compensate for color temperature of the display, color temperature of light sources, or other color correction attributes. For example, if the display includes red, green, and blue colors, the color adjustments 418 may be an indication to scale the red, green, and blue values by a specified amount relative to the amount present in the frame data 450. Alternatively, the color adjustments may include scaling factors for each color independently. As still another alternative, the color adjustments 418 may be specified as an offset to add or subtract from the frame data 450 for each color or for all colors.

In some embodiments, the frame information 412, or display information 414 may include a content portion indicator for each display. Thus, each display may be configured to select its own portion of the common content based on the content portion indicator for presentation on its display. As a non-limiting example, one display may be configured to present lines 1-240 of the common content, another display may be configured to present lines 241-480 of the common content, and yet another display may be configured to present lines 1-480. Similarly, one display may be configured to present columns 1-320 of the common content, another display may be configured to present columns 321-640 of the common content, and yet another display may be configured to present columns 1-640.

Figure 8:
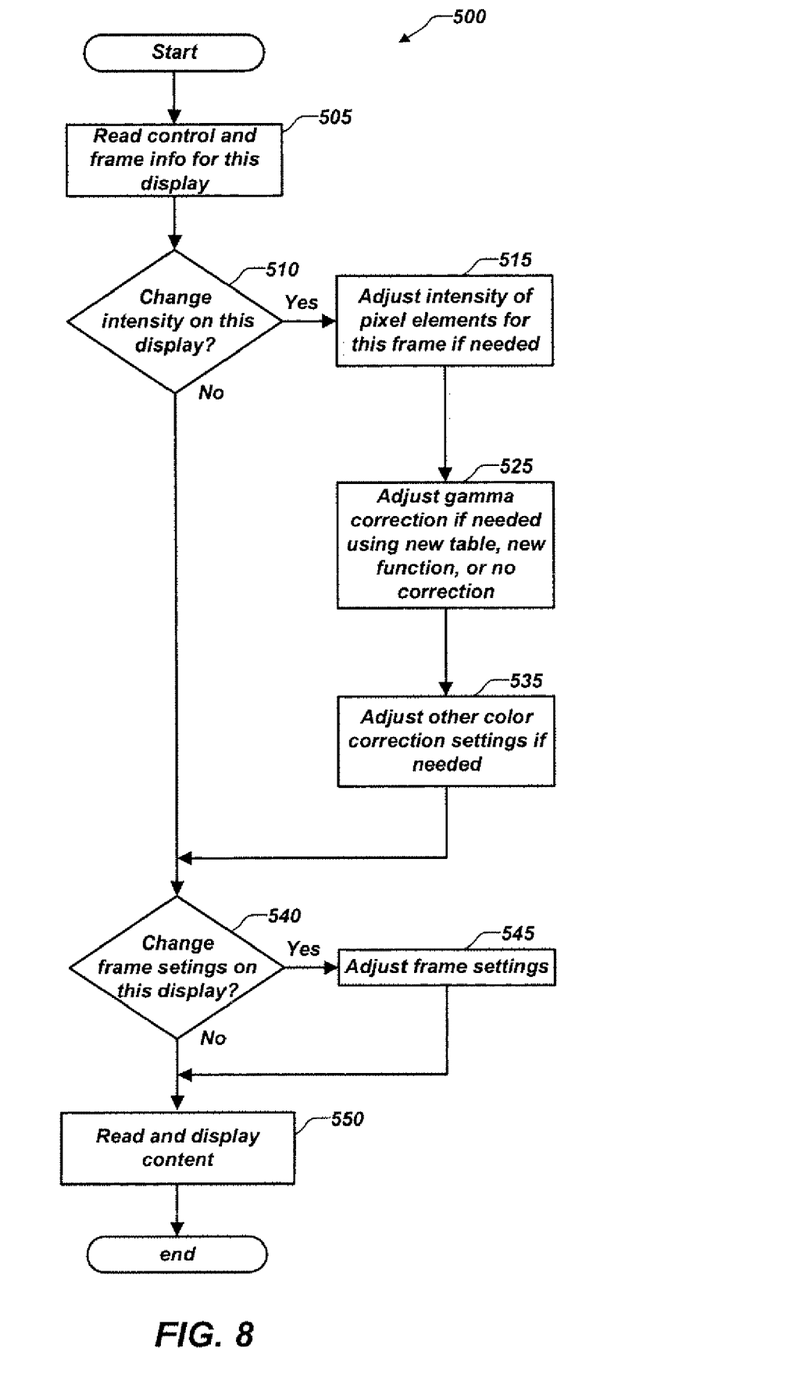
FIG. 8 is a simplified flow diagram of some actions that may be taken by a display element when presenting content.

FIG. 8 is a simplified flow diagram of some actions that may be taken by any given display 300 when presenting content 500. Operation block 505 indicates the control and frame information for this display 300 is read and applied to this display 300. This control and frame information may include some information that is common to all displays 300 and some information that is specific to this display 300 only.

Decision block 510 tests to see if the intensity of this display 300 should be adjusted. Thus, this specific display 300 checks to see if there is any discrete radiance-control information addressed to it that should be used to modify the content as it is displayed. If the intensity is to be adjusted, operation block 515 would define the intensity adjustment as explained earlier and apply it to pixels as they are displayed, or prior to display in a frame buffer (not shown) that may exist on the display 300. If gamma is to be adjusted, operation block 525 would define the gamma adjustment as explained earlier and apply it to pixels as they are displayed, or prior to display in a frame buffer (not shown) that may exist on the display 300. If other color adjustments are to be performed, operation block 535 would define the color adjustment as explained earlier and apply it to pixels as they are displayed, or prior to display in a frame buffer (not shown) that may exist on the display 300.

The tests for discrete radiance-control information and other control information described above for decision block 510 may be from information that is received in the control header 410 for the current frame data 450, or it may be stored in the controller 310 for the particular display 300 based on information received in previous control headers 410. In addition, the intensity, gamma, and color adjustments may be combined in a number of different manners. As a non-limiting example, a gamma table could be defined that corrects for gamma, intensity, and color temperature all in a single table.

Decision block 540 tests to see if frame settings, such as, for example, frame size and content portion for this display should be modified. Thus, this specific display 300 checks to see how large the common content is and if it should extract a portion of the common content for presentation on its display element. If the frame settings have changed, operation block 545 sets new parameters for the frame to be displayed.

Operation block 550 indicates the frame information is read from the graphics data structure 400, and presented on the display 300 with the modification as needed based on the previous decisions and operations. This frame data may be modified and displayed in near real time as it is received on the graphics communication bus 275, or it may be stored in a frame buffer for subsequent presentation. Furthermore, the display may scale the frame information for presentation on its display. As a non-limiting example, the frame information may include information for a total 1024×768 pixels. However, the content portion indicator for a display may indicate that it should display the columns from 513 to 1024 and the lines from 401-768. However, the display may be configured as 640 pixels by 480 pixels. Thus, the display may scale the 512 horizontal pixels in the portion of the common content that it is to display up to the 640 pixels of its display. Similarly, the display may scale the 368 vertical pixels in the portion of the common content that it is to display up to the 480 pixels of its display.

The entire process of presenting content 500 may be repeated for each frame that is sent to the display 300 over the graphics communication bus 275. Thus, each display 300 of a multifaceted display apparatus 100 may include different radiance characteristic while displaying the same content received on the same graphics communication bus 275.

Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A display system, comprising:
    a plurality of displays of a common display apparatus; and
    a graphics communication bus coupled to the plurality of displays, the graphics communication bus configured to communicate graphics information to the plurality of displays, wherein the graphics information includes:
        common content information to be shared and displayed by each display of the plurality of displays; and
        discrete radiance-control information that includes information that is distinct for each display of the plurality of displays, and wherein each display of the plurality of displays is configured to present at least a portion of the common content information and adjust at least one radiance characteristic of its display responsive to the discrete radiance-control information that is distinct for its display.

2. The display system of claim 1, wherein the plurality of displays of the common display apparatus are oriented in at least two different outward directions.

3. The display system of claim 1, wherein the discrete radiance-control information is selected from the group consisting of output intensity, output color adjustment, gamma adjustment, color temperature adjustment, and combinations thereof.

4. The display system of claim 1, further comprising:
    at least one light sensor associated with at least one display of the plurality of displays; and
    a computing system operably coupled to the at least one light sensor and the graphics communication bus, wherein the computing system is configured to:
        incorporate light information from the at least one light sensor into the discrete radiance-control information for the associated at least one display of the plurality of displays; and
        transmit the graphics information to the graphics communication bus.

5. The display system of claim 1, wherein adjustment information used to determine the discrete radiance-control information is based at least in part on external light source information.

6. The display system of claim 1, wherein the graphics communication bus is selected from the group consisting of VGA, DVI, HDMI, and SDI.

7. The display system of claim 1, wherein adjustment information used to determine the discrete radiance-control information is based at least in part on at least one of time of day information, sun position information, and moon position information.

8. The display system of claim 1, wherein the graphics information includes a graphics data structure that includes a control header and frame data, wherein the control header includes the discrete radiance-control information, and wherein the frame data includes the common content information.

9. The display system of claim 8, wherein the control header includes specific fields within a frame that are addressed to a corresponding specific display of the plurality of displays of displays.

10. The display system of claim 8, wherein the control header is organized by frames such that each frame includes an indicator that any discrete radiance-control information within the frame is for a specific display of the plurality of displays.

11. A display system, comprising:
a multifaceted display apparatus having at least one display of a plurality of displays associated with a different facet of the multifaceted display apparatus oriented in at least two different directions; a computing system including at least one processor; and
a graphics communication bus operably coupled to the computing system and the plurality of displays to deliver graphics information to each display of the plurality of the displays, wherein the graphics information includes common content information and discrete radiance-control information, and wherein the display system is configured to adjust at least one radiance characteristic of the at least one display differently from at least one other radiance characteristic of at least one other display responsive to adjustment information corresponding to the discrete-radiance control information.

12. The display system of claim 11, further comprising a plurality of ambient light sensors operably coupled to the computing system, wherein each ambient light sensor is associated with a display of the plurality of displays and the adjustment information is correlated to light information from at least one of the plurality of ambient light sensors.

13. The display system of claim 12, wherein the plurality of ambient light sensors include more than one ambient light sensor associated with each display of the plurality of displays and the light information for each display includes a combination of light information from the more than one ambient light sensor associated with each display.

14. The display system of claim 11, wherein the at least one graphical output characteristic is selected from the group consisting of output intensity, output color, gamma, color temperature, and combinations thereof.

15. The display system of claim 11, wherein the adjustment information is correlated to an attribute selected from the group consisting of time of day information, sun position information, moon position information, external light source information, and combinations thereof.

16. The display system of claim 11, wherein each display of a plurality of displays includes:
a controller;
a display element; and
a plurality of display drivers coupled between the controller and the display element, wherein each display driver of the plurality of display drivers is configured to control a different portion of the display element.

17. The display system of claim 11, wherein the plurality of displays are serially coupled to the graphics communication bus.

18. The display system of claim 11, wherein the plurality of displays are coupled with each other in parallel to the graphics communication bus.

19. The display system of claim 11, wherein each display of the plurality of displays receives the same graphics information, such that each display of the plurality of displays is configured to distinguish which of portions of the discrete radiance-control information is intended for that display.

20. A method, comprising:
controlling a plurality of displays from a graphics communication bus;
receiving output control information on the graphics communication bus, wherein the output control information includes a separate output control field for each display of the plurality of displays, and a common output field shared by at least two displays of the plurality of displays; and
adjusting at least one radiance characteristic of at least one display of the plurality of displays responsive to receiving the output control information correlated to the at least one display.

21. The method of claim 20, wherein the at least one radiance characteristic is selected from the group consisting of output intensity, output color adjustment, gamma adjustment, color temperature adjustment, and combinations thereof.

22. The method of claim 20, further comprising:
sensing an ambient light incident on at least one facet of at least one display of the plurality of displays; and
modifying the output control field for the at least one facet responsive to the ambient light incident on the at least one facet.

23. The display system of claim 20, wherein the output control field includes information correlated to an attribute selected from the group consisting of time of day information, sun position information, moon position information, external light source information, and combinations thereof.

24. A method, comprising:
communicating graphical information to a plurality of displays, wherein the graphical information includes a discrete radiance-control portion for each display of the plurality of displays, and a common content portion for shared content of at least two displays of the plurality of displays;
modifying the common content portion for at least one display of the plurality of displays in response to the discrete radiance-control portion corresponding to that display; and
displaying the common content portion for each display of the plurality of displays.

25. The method of claim 24, wherein the discrete radiance-control portion includes controls for characteristics selected from the group consisting of output intensity, output color adjustment, gamma adjustment, color temperature adjustment, and combinations thereof.

26. The display system of claim 24, wherein the discrete radiance-control portion includes information correlated to an attribute selected from the group consisting of time of day information, sun position information, moon position information, external light source information, and combinations thereof.

27. The method of claim 24, further comprising:
sensing an ambient light incident on at least one facet of at least one display of the plurality of displays; and
modifying the discrete radiance-control portion for the at least one facet responsive to the ambient light incident on the at least one facet.

28. The method of claim 24, wherein the graphical information includes a content portion indicator for each display of the plurality of displays, the method further comprising:
selecting a portion of the common content portion for at least one display of the plurality of displays in response to the content portion indicator corresponding to that display; and
displaying the portion of the common content portion on the at least one display of the plurality of displays.

* * * * *